United States Patent Office.

JOSEPH B. BIDWELL, OF GRAND RAPIDS, MICHIGAN, ASSIGNOR TO HIMSELF AND JOHN C. KNOBLOCK, OF SOUTH BEND, INDIANA.

Letters Patent No. 97,155, dated November 23, 1869.

IMPROVED CONFECTION FROM RAISINS.

The Schedule referred to in these Letters Patent and making part of the same.

To all whom it may concern:

Be it known that I, JOSEPH B. BIDWELL, of Grand Rapids, in the county of Kent, and State of Michigan, have invented a certain compound called Azucar Racemo, or Sugar-Raisins; and I do hereby declare that the following is a full, clear, and exact description thereof, enabling others skilled in the art to make and use the article.

The nature of my invention consists in coating raisins with a compound of sugar, water, cream of tartar, and flavoring-extract.

To manufacture the Azucar Racemo, I take twenty-five pounds of refined sugar; two and a quarter quarts of water; two ounces of cream of tartar; and one-quarter ounce of flavoring-extract, and mix these components, and dissolve the mass to a sirup by heating it. It is then taken off the fire, and four (4) pounds of raisins, properly prepared, are stirred in it, the stirring being continued until crystallization takes place. During this process, a portion of the compound will form around each raisin, thus coating it.

What I claim, is—

As a new article of confectionery, raisins coated by a compound composed of the ingredients, and substantially in the proportions set forth.

In testimony whereof, I have signed my name to this specification, in the presence of two subscribing witnesses.

JOS. B. BIDWELL.

Witnesses:
A. N. DEACON,
JOHN H. SHUNK.